UNITED STATES PATENT OFFICE 2,548,264

TUMBLING PROCESS FOR BEARING ASSEMBLIES

James A. Howe, Wood-Ridge, N. J., assignor to Bendix Aviation Corporation, Teterboro, N. J., a corporation of Delaware No Drawing. Application March 16, 1948, Serial No. 15,262

7 Claims. (Cl. 51—282)

This invention relates to a process for improving the performance of ball bearings, and more particularly to tumbling procedures for ball bearings by which the inner and outer races, balls and retainers are mated to improve the starting and running torques of the bearings.

The present application is directed to, and claims a novel process for tumbling ball bearing assemblies and discloses tumbling solutions used in the process which are disclosed and claimed in copending divisional application Serial No. 167,975, filed June 13, 1950, assigned to the assignee of the instant application.

In the manufacture of ball bearings such as are used in precision instruments and apparatus, the practice has been to make each individual part of the bearing according to the specifications of the drawing for such part. The bearing parts were thereafter assembled and the assembled bearings expected to perform to a predetermined specification. This procedure resulted in a small percentage of the bearings meeting the exacting requirements for precision instruments and apparatus, particularly with regard to the starting and running torque. In the mass production of ball bearings it is impossible and impractical to make each of the bearing parts exactly alike. Slight variations of the part dimensions will occur, although within the specifications of the drawing. These slight variations in the assembled ball bearing are cumulative and result in a variable performance.

In the case of machinery or engine manufacturers, the mass production of the several parts of the unit within the drawing specifications will result in unlike parts. The common practice in such manufacturing is to run-in the moving parts after assembly in order to wear-in the moving parts with the mating stationary parts. All irregularities between the mating surfaces are eliminated so that an unbroken film of oil will exist between the bearing surfaces of two or more cooperating parts. The present invention may be likened to this run-in or wear-in procedure.

An object, therefore, of my present invention is to provide a tumbling process for assembled bearings in which the various parts thereof are properly mated by eliminating all irregularities on the contact surfaces.

A further object of my invention is to provide a tumbling process for assembled bearings in which the contact surface finishes are improved to provide the specified starting and running torques of the bearings.

Still a further object of my invention is to provide a tumbling process of the character indicated in which finely suspended abrasives are used in the tumbling solution.

Still another object of my invention is to provide a tumbling process for bearings of the character indicated in which charging of the surfaces by abrasives is eliminated.

A further object of this invention is to provide a tumbling process for bearings of the character indicated in which all materials used during the process are completely eliminated thereby preventing future damage to the finished bearing surfaces.

Yet a further object of the invention is to provide in a tumbling process for assembled bearings of the character indicated, a drying step for the tumbled assemblies prior to oiling to prevent the formation of rust or corrosion.

Yet another object of this invention is to provide a tumbling process for bearings which shall comprise of few and simple steps readily adapted to mass production methods, which will prove to be relatively inexpensive to carry out, and by which bearings assembled from parts made to drawing specifications will perform in accordance with the specified starting and operating torques.

Other objects of my invention will in part be obvious and in part hereinafter pointed out.

While an abrasive material is employed in my tumbling procedure, I have found that there is no risk of any of it remaining in bearings after completion of my tumbling process. Likewise, while soap is employed in the tumbling process, means are employed for so completely removing it, following treatment, that no residue remains to cause rust, corrosion, coagulation of the lubricant, or other troubles. My improved procedure leaves the bearings microscopically and chemically clean.

In carrying out my improved process, I degrease the assembled bearings in a grease solvent of toluol or toluene together with 5 per cent alcohol (ethyl).

After the assembled bearings are thoroughly cleaned of grease, I tumble the bearings for a minimum of 72 hours in a solution consisting of one (1) gallon of distilled water, 1.8 grams of potassium cyanide, 2 grams of Alconox, or like detergent; 80 grams of pure linseed oil soap, and 30 grams of levigated alumina (finest grade). The temperature of the solution is not critical, the amounts of the dissolved ingredients are minimums. The amount of cyanide in the solution must be sufficient to raise the pH factor to at least 10 to prevent rust.

In carrying out the procedure thus far outlined, and the subsequent steps, the temperature at which my procedure is followed is not critical, the average room temperature being satisfactory. I prefer to use glass bottles in my process for the sake of cleanliness. The tumbling of the bearing assemblies in the solution is done with a rotational motion combined with a screwing or shuffling motion. The bearings are not tightly packed, but are not so loose as to permit hammering and consequent brinelling.

In the tumbling solution set forth, de-ionized water prepared by the use of zeolites and having a normal or neutral pH factor may be used in place of the distilled water. While I have indicated the use of potassium cyanide in the foregoing solution, sodium cyanide might be used in place thereof. Sodium cyanide will discolor brass or bronze retainers while potassium cyanide will not. With all steel bearings the following equivalents may be used to maintain the 10 pH concentration specified, the preference being indicated in the order given: potassium carbonate, potassium hydroxide, sodium carbonate or sodium hydroxide. This range of equivalents may be used in the steps to follow, as noted.

Instead of pure linseed oil soap, which has the best lubricating qualities, a good quality vegetable oil or animal fat soap may be used. The substituted soap must be one in which saponification is completed, and in which there is no free fatty acid, and which has a low oxidation factor. The levigated alumina, which is by far the best, may be replaced by other metallic oxides, such as stannic oxide, provided they are sufficiently finely divided and light enough to remain in suspension in the solution.

The detergent Alconox in the above solution is a synthetic detergent used to reduce surface tension tending to emulsify rather than saponify thereby converting any free oil present in the solution into a water soluble compound.

The solution and its equivalents set forth, acts as a combined abrasive, lubricant, and anti-rust. Upon completion of the initial tumbling step, the solution is drained off and the bearings rinsed thoroughly in acid-free running water.

Upon completion of the washing step, the rinsed bearing assemblies are placed in a second solution without delay and again tumbled, this time for a period of at least 24 hours. The second solution consists of one (1) gallon of distilled water, 1.8 grams of potassium cyanide and 100 grams of pure linseed oil soap. The equivalents set out above may be substituted in the foregoing solution. The solution used in this step acts as a lubricant and burnishing agent, anti-rust, and eliminates all traces of the abrasive remaining from use of the first solution.

The second solution is then drained off and the bearings rinsed thoroughly in acid-free running water. Immediately thereafter, the bearings are again tumbled for at least two (2) hours in a solution consisting of one (1) gallon of distilled water, 1.8 grams of potassium cyanide, and 1.5 ounces of Alconox. The equivalents noted above may be substituted for this solution. The solution provided for this step acts as a detergent and anti-rust which eliminates all traces of soap remaining from the preceding solution.

After two hours of tumbling, one-half of the third solution is drained off and replaced by an equal amount of distilled water. The bearings are again tumbled in the diluted solution for at least one-half hour preparatory to the final rinsings.

The diluted solution is then drained off and the bearings are rinsed thoroughly in three (3) separate distilled water baths for twenty seconds each. The bearings are then dried immediately under a hot filtered air blast.

The dried bearing assemblies are then rinsed well for 10 seconds in a suitable light oil bath held at a minimum temperature of 250° F. The bearings are then stored in a suitable lubricating oil and container. Prior to use, the surplus lubricating oil is blown off by a blast of clean air.

The improved procedure set forth results in such a uniform performance of the bearings that only a negligibly small percentage fail to meet precision bearing requirements. The very small percentage of bearings that fail in a first test, almost always pass a second test after being given an additional tumbling treatment. Further, the improved tumbling process is such as to definitely inhibit and prevent rust and corrosion on any parts of the assembled bearings while they are undergoing the procedure, and enormously increase the ability of the surfaces of the bearing parts to resist rust or corrosion thereafter. Tests have proved that parts so treated can, without any other protection, be subjected to the ordinary indoor atmosphere for months without signs of rust or corrosion appearing.

It will thus be seen that there is provided a tumbling procedure which properly mates the various parts by eliminating all irregularities on the contact surfaces and greatly improving the contact surface finishes, with a consequent improvement of the starting and running torques of the bearing.

Having thus described my invention, I claim as new and desire to secure by Letters Patent:

1. A tumbling process for bearings comprising the steps of subjecting the bearings to a grease solvent, tumbling the bearings in an alkaline solution of water, a detergent, a lubricant, and an abrasive; rinsing the bearings in acid-free water, tumbling the bearings in an alkaline solution of water and a lubricant; rinsing the bearings in acid-free water, tumbling the bearings in an alkaline solution of water and a detergent; then tumbling the bearings in a diluted solution of water and a detergent; rinsing the bearings in acid-free water, drying the bearings under a hot filtered air blast, and then rinsing the bearings in a suitable light oil.

2. A tumbling process for bearings comprising the steps of subjecting the bearings to a grease solvent, tumbling the bearings for at least 72 hours in an alkaline solution of water, a detergent, a lubricant, and an abrasive; rinsing the bearings in acid-free water, tumbling the bearings for at least 24 hours in an alkaline solution of water and a lubricant; rinsing the bearings in acid-free water, tumbling the bearings for at least 2 hours in an alkaline solution of water and a detergent; then tumbling the bearings for at least one-half hour in a diluted solution of water and a detergent; rinsing the bearings in acid-free water, drying the bearings under a hot filtered air blast, and then rinsing the bearings in a suitable light oil.

3. A tumbling process for bearings comprising the steps of subjecting the bearings to a grease solvent, tumbling the bearings for at least 72 hours in an alkaline solution of water, a detergent, a lubricant, and an abrasive; rinsing the bearings in acid-free water, tumbling the bearings for at least 24 hours in an alkaline solution of water and a lubricant; rinsing the bearings in acid-free water, tumbling the bearings for at least 2 hours in an alkaline solution of water and a detergent; then tumbling the bearings for at least one-half hour in a diluted solution of water and a detergent; rinsing the bearings in three acid-free water baths for 20 seconds in each, drying the bearings immediately thereafter under a hot filtered air blast, and then rinsing the bearings for 10 seconds in a suitable light oil held at a minimum temperature of 250° F.

4. A tumbling process for bearings comprising the steps of subjecting the bearings to a grease solvent, tumbling the bearings in an alkaline solution of water, a detergent, soap having no free fatty acid, and an abrasive; rinsing the bearings in acid-free water, tumbling the bearings in an alkaline solution of water and soap having no free fatty acid; rinsing the bearings in acid-free water, tumbling the bearings in an alkaline solution of water and a detergent; then tumbling the bearings in a diluted solution of water and a detergent, rinsing the bearings in acid-free water, drying the bearings immediately thereafter under a hot filtered air blast, and then rinsing the bearings in a suitable light oil.

5. A tumbling process for bearings comprising the steps of subjecting the bearings to a grease solvent, tumbling the bearings in an alkaline solution of one gallon of water, 2 grams of a detergent, 80 grams of soap having no free fatty acid, and 2 grams of an abrasive; rinsing the bearings in acid-free water, tumbling the bearings in an alkaline solution of one gallon of water and 100 grams of soap having no free fatty acid; rinsing the bearings in acid-free water, tumbling the bearings in an alklaline solution of one gallon of water and 1.5 ounces of a detergent; then tumbling the bearings in a diluted solution of water and detergent; rinsing the bearings in acid-free water, drying the bearings immediately thereafter under a hot filtered air blast, and then rinsing the bearings in a suitable light oil.

6. A tumbling process for bearings comprising the steps of subjecting the bearings to a grease solvent, tumbling the bearings in a solution of one gallon of water, 1.8 grams of potassium cyanide, 2 grams of a detergent, 80 grams of soap having no free fatty acid, and 30 grams of an abrasive; rinsing the bearings in acid-free water, tumbling the bearings in a solution of one gallon of water, 1.8 grams of potassium cyanide and 100 grams of soap having no free fatty acid; rinsing the bearings in acid-free water, tumbling the bearings in a solution of one gallon of water, 1.8 grams of potassium cyanide and 1.5 ounces of a detergent; then tumbling the bearings in a diluted solution of the latter, rinsing the bearings in three acid-free water baths, drying the bearings immediately thereafter under a hot filtered air blast, and then rinsing the bearings in a suitable light oil.

7. A tumbling process for bearings comprising the steps of subjecting the bearings to a grease solvent, tumbling the bearings for at least 72 hours in a solution of one gallon of water, 1.8 grams of potassium cyanide, 2 grams of a detergent, 80 grams of soap having no free fatty acid, and 30 grams of an abrasive; rinsing the bearings in acid-free water, tumbling the bearings for at least twenty-four hours in a solution of one gallon of water, 1.8 grams of potassium cyanide and 100 grams of soap having no free fatty acid; rinsing the bearings in acid-free water, tumbling the bearings for at least 2 hours in a solution of one gallon of water, 1.8 grams of potassium cyanide and 1.5 ounces of a detergent; then tumbling the bearings for at least one-half hour in a diluted solution of the latter, rinsing the bearings in three acid-free water baths for at least 20 seconds each, drying the bearings immediately thereafter under a hot filtered air blast, and then rinsing the bearings in a suitable light oil held at a minimum temperature of 250° F. for 10 seconds.

JAMES A. HOWE.

REFERENCES CITED

The following references are of record in the file of this patent:

UNITED STATES PATENTS

| Number | Name | Date |
| --- | --- | --- |
| 1,422,707 | Hemming | July 11, 1922 |
| 1,887,026 | Lach | Nov. 8, 1932 |
| 2,130,128 | Griesinger | Sept. 13, 1938 |
| 2,359,323 | Lupo | Oct. 3, 1944 |